United States Patent [19]

Hehl

[11] 4,196,634
[45] Apr. 8, 1980

[54] VALVE DEVICE FOR SELECTIVELY CONNECTING A PRESSURE GAUGE TO A PLURALITY OF PRESSURE LINES

[76] Inventor: Karl Hehl, Arthur-Hehl-Strasse 32, 7298 Lossburg, Fed. Rep. of Germany

[21] Appl. No.: 911,271

[22] Filed: Jun. 1, 1978

[30] Foreign Application Priority Data

Jun. 7, 1977 [DE] Fed. Rep. of Germany ....... 2725575

[51] Int. Cl.² .............................................. G01L 7/00
[52] U.S. Cl. ................................... 73/756; 137/675.12
[58] Field of Search ...................... 73/756; 137/625.12, 137/625.17, 625.41, 557

[56] References Cited

U.S. PATENT DOCUMENTS

| | | | |
|---|---|---|---|
| 3,246,667 | 4/1966 | Pemberton | 137/625.11 |
| 3,511,273 | 5/1970 | Bartholomaus | 137/625.17 |
| 3,526,136 | 9/1970 | Caldwell, Sr. et al. | 173/756 |
| 3,881,358 | 5/1975 | Wolfges | 73/756 |

Primary Examiner—Donald O. Woodiel
Attorney, Agent, or Firm—Joseph A. Geiger

[57] ABSTRACT

A rotary valve device for the selective connection of a pressure sensing device to any one of a number of separate pressure lines in a hydraulic control system, the selector valve comprising a cylindrical valve base with axial pressure line bores on a circle and a pressure relief bore on a larger radius, each bore having arranged therein a spring-loaded valve with a valve plunger whose protruding head cooperates with a rotatable selector disc. The selector disc, settable by means of a selector sleeve, carries a selector cam for the pressure line valves and a series of pressure relief cams for the pressure relief valve which is opened half-way between adjacent pressure line connection positions. A detent mechanism, with detent cams on the selector disc, positions the device in all pressure line connecting positions and pressure relief positions. A pressure gauge is connected to the pressure line valves via a central connecting cavity.

16 Claims, 12 Drawing Figures

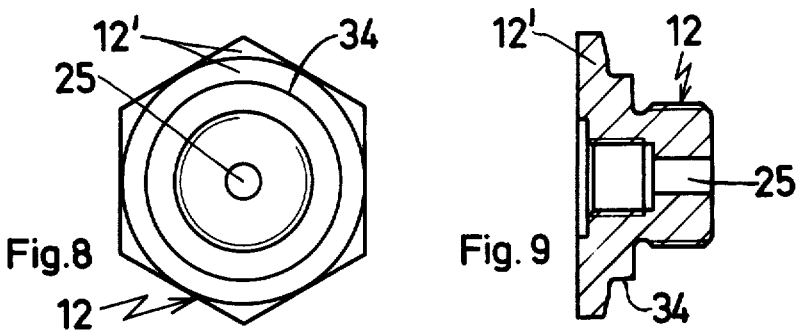
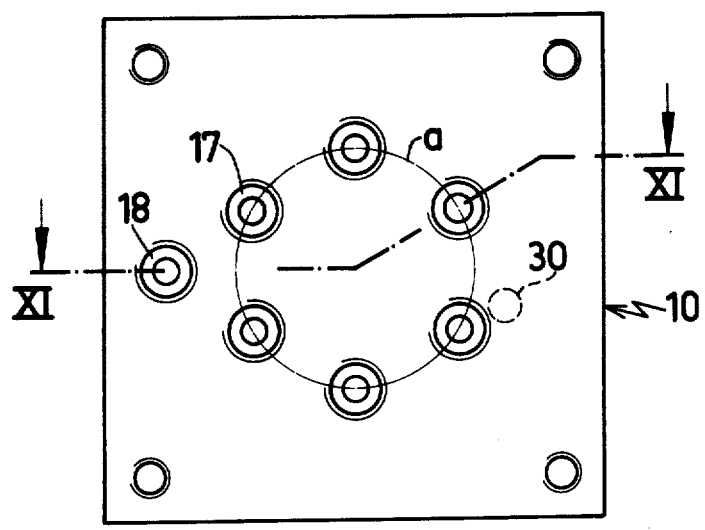
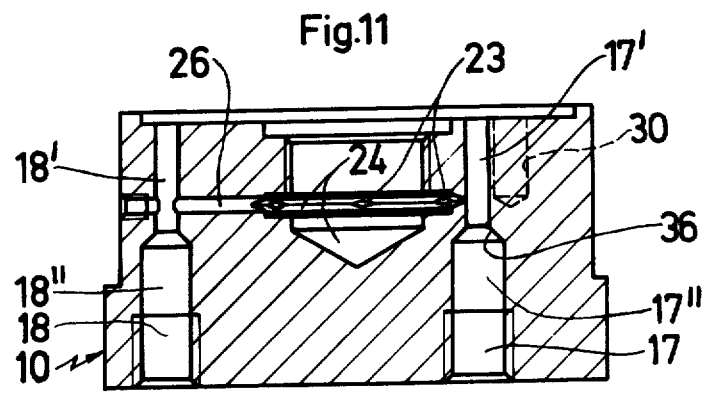

VALVE DEVICE FOR SELECTIVELY CONNECTING A PRESSURE GAUGE TO A PLURALITY OF PRESSURE LINES

BACKGROUND OF THE INVENTION

1. Field of the Invention

The present invention relates to multi-channel fluid flow control devices and, more particularly, to a valve device for the selective connection of a control component, such as a pressure gauge, to any one of a plurality of pressure lines of a fluid control system, like the hydraulic control system of an injection molding machine or other production machine.

2. Description of the Prior Art

While it is possible to provide a separate pressure gauge for each of a plurality of pressure lines of a fluid control circuit whose pressures are to be measured, it is often preferable, for reasons of space requirements and cost, as well as measurement consistency, to use a single pressure gauge, in combination with a suitable selector device by means of which the pressure gauge can be selectively connected to any one of the various pressure lines. Such a selector device, or selector valve, offers attractive advantages, particularly in connection with the hydraulic control circuitry of an injection molding machine, for example.

Selector valves of this type are normally multi-way valves featuring a rotatable control member whose angular position determines which one of the different pressure lines is connected to the pressure gauge. The rotary control member is in most cases provided with a detent mechanism which facilitates a step-by-step angular displacement of the control member, thereby connecting the different pressure lines to the pressure gauge, one at a time.

Several selector valves of this type have already been suggested in the prior art. These selector valves fall into one of two operationally distinct types of valves: In one type of selector valve, the rotatable control member itself performs a valve opening and closing action, i.e. the control member contains one or more flow channels which, through their displacement relative to cooperating stationary flow channels in the selector device, open and close the various pressure line channels. In the second type of selector valve, each pressure channel is provided with a separate, independently operable shutoff valve, and the rotatable control member of the selector device is operatively connected to the shutoff valves in such a way that each valve is actuated at a different angular position of the rotatable control member.

Two selector valves of the first-mentioned type are disclosed in U.S. Pat. No. 3,511,273 and U.S. Pat. No. 3,881,358. In both cases, the selector valve consists of a stationary valve base, or valve stator, which cooperates with a valve rotor on a cylindrical interface. The valve stator contains the connections for the various pressure lines, each pressure line having a port at the cylindrical interface. The valve rotor contains a selecting channel which, depending on its angular position with respect to the valve stator, connects a selected pressure line to the pressure gauge. The latter may be mounted on the valve rotor, or it may be mounted on the valve stator, in which case the selection channel of the rotor leads back into the stator, via an annular groove at the interface.

Another selector valve of the first-mentioned type, with an interface in a planar orientation, is disclosed in U.S. Pat. No. 3,246,667. This selector valve is specially adapted for a continuous and rapid opening and closing action of the various pressure lines which are thus successively connected to a pressure transducer, thereby obtaining a sweep-type measurement of a series of control pressures. As in the previously described version, the stationary part of the selector device contains the pressure line connections which lead to separate ports at the stationary side of the valve interface. A selector channel in the interface side of the rotatable control connects the selected pressure line port with the centrally located pressure transducer.

Selector valves of this type require precision-fabricated components which form the valve interface, in order to minimize leakage along the interface and between adjacent pressure line ports. Valves of this type require particularly high accuracy with respect to the location of the pressure line ports at the interface and with respect to the selecting channel in the valve rotor. These valves also necessitate a return line to the fluid tank, for the removal of leaked fluid. In the case of substantial leakage, the selector device may become subject to heat buildup.

A prior art selector valve of the second type is disclosed in German Pat. No. 380,532. This prior art device features a housing containing a straight row of shutoff valves, each controlling a separate incoming pressure line. Also arranged inside the housing is a rotatably journalled camshaft which has a lift cam for each shutoff valve, the various lift cams being angularly offset in such a way that only one pressure line is connected to the pressure gauge, while all other pressure lines are closed.

One shortcoming of this type of selector valve is that it is subject to inaccurate pressure readings, when successively selected pressure lines have only small pressure differentials. In an attempt to solve this problem, the prior art device has been fitted with a central check valve and a reduced-orifice reverse flow passage. An additional shortcoming of this prior art selector valve is found in the fact that the line pressure of the selected pressure line is allowed to impinge on the back side of all other shutoff valves, thus requiring highly preloaded valve closing springs for those pressure lines which have a much lower operating pressure.

SUMMARY OF THE INVENTION

Underlying the present invention is the primary objective of providing an improved selector valve of the type which has a separate shutoff valve for each pressure line, a selector valve which is better adapted for quantity production and which offers a simplified assembly, as well as greater ease in operation and servicing.

The present invention proposes to attain this objective by suggesting a selector valve which comprises a valve base with a plurality of pressure line bores extending axially through the base, on a circle around the valve axis, each bore having in its forward portion a pressure line valve in the form of a valve seat and a cooperating spring-loaded valve plunger with a stem that protrudes forwardly for engagement by a rotatable selector disc. The latter carries a selector cam on the same radius as the pressure line bores, so that, when the cam is aligned with a selected bore position, it opens the pressure line valve.

At the center of the valve base, in its forward portion, is arranged a connecting cavity which communicates radially with all the pressure line bores and opens radially into a centrally mounted pressure gauge. The valve plungers of the pressure line valves are preferably so arranged that they have a forwardly extending valve stem with a head which seals off the forward end of the pressure line bores, the connections with the central collecting cavity being arranged between the sealed-off bore portions and the valve seats.

The invention further suggests a pressure relief line, or tank line, to be arranged in the valve base in the form of a pressure relief bore which is similar to the pressure line bores, but arranged at a different distance from the valve axis. Like the pressure line bores, the pressure relief bore is equipped with a valve whose spring-loaded valve plunger protrudes forwardly from the front end of the pressure relief bore, sealing off the latter. At the circle defined by the radius of the pressure relief bore, the selector disc carries a series of relief cams which are so arranged that the pressure relief valve is opened, whenever the selector cam is positioned between two adjacent pressure line valves. In this way, the pressure gauge is depressurized, when the selector disc is switched from one pressure line position to another, or when it is held between pressure line positions, as when the pressure gauge is not in use. The latter feature has the advantage of eliminating any heat buildup in the selector valve, which may be caused by leakage from the pressure lines.

The arrangement of the pressure line bores and pressure relief bore in the valve base, and of the cooperating selector cam and relief cams on the selector disc, is preferably such that the pressure line bores are located at regular angular intervals on the pressure line circle, so that the relief cams on the selector valve can be arranged at the same angular intervals, on a different, preferably larger circle. It is further suggested that the pressure relief bore be arranged at mid-angle between two adjacent pressure line bores and that the selector cam be arranged in angular alignment with one of the relief cams.

In order to facilitate the positioning of the selector disc in the various pressure line connection positions and pressure relief positions, the invention further suggests a series of detent cams on the selector disc which cooperate with an axially guided spring-loaded detent member in the valve base. However, for this detent means to provide a detent action for all the line connection positions as well as all the pressure relief positions, the selector disc must carry twice as many detent cams as relief cams.

The arrangement of the various cams on the selector disc can be greatly simplified by using the same cam shape for all three types of cams and by angularly aligning every second detent cam with a pressure relief cam, so that there will be a single radially elongated cam formation at each angle at which more than one cam is located. This is accomplished by choosing as a cam shape a regular succession of oppositely inclined flat cam surfaces of which the crests provide the valve opening action and the valleys determine the detent positions. For this to be possible, the position of the detent member in the valve base must be arranged at an angle which is located between two adjacent pressure line bores, at a distance of one-quarter and three-quarters, respectively, of their angular spacing. In the radial sense, the detent member is preferably arranged between the radius of the pressure line bores and the radius of the pressure relief bore.

In a preferred embodiment of the invention, the valve base is cylindrical in shape, having a square mounting flange on its rear side. A conventional pressure gauge is attached to its front side by means of a threaded socket which, while serving as a plug for the central connecting cavity of the valve base, also serves as a rotational support for the selector disc. To the selector disc is attached a selector sleeve which surrounds and encloses both the valve base and the pressure gauge, thereby protecting the latter and conveniently serving as a hand-rotatable control member for the selector valve. The rear portion of this selector sleeve is preferably arranged as a dial, carrying pressure line information, while the front portion of the sleeve is provided with an appropriately serrated circumference, for easier manipulative engagement.

Lastly, the present invention suggests that the valve plungers of the pressure line valves and relief valve be so arranged that the pressure which is communicated to the valve bore portions from the central connecting cavity is substantially neutralized in the axial sense, so that there will be no tendency for any of the valves to open against the closing spring, under an elevated pressure. For this purpose, the valve bore portions have a continuous diameter from the valve seat to their sealed-off forward end portions, and the valve plunger have a reduced-diameter portion between their forwardly extending heads, in order to define annular flow channels which communicate with the central connecting cavity. By selecting a narrower taper for the shoulder of the valve plunger than for the shoulder of the valve bore portion, the valve seat is restricted to a diameter which is the same, or almost the same, as the diameter of the head on the plunger stem, thereby neutralizing the effect of the pressure in the annular flow channel on the valve plunger.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows:

FIG. 8 shows the threaded socket of the selector valve of FIGS. 1-4 in an end view;

FIG. 9 shows the threaded socket of FIG. 8 in a longitudinal cross section;

FIG. 10 is an end view of the valve base, showing the arrangement of the various bores therein; and FIG. 11 is an axial cross section through the valve base of FIG. 10, taken along line XI—XI thereof.

BRIEF DESCRIPTION OF THE DRAWINGS

Figure 1:
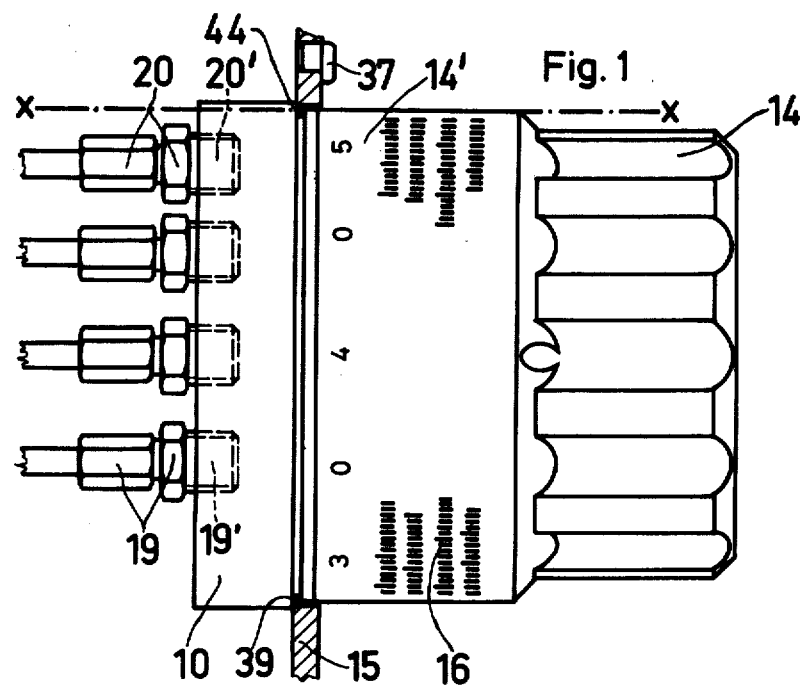
FIG. 1 shows, in a side view, a selector valve embodying the present invention, as installed in a vertical panel wall of a machine, for example.
Figure 2:
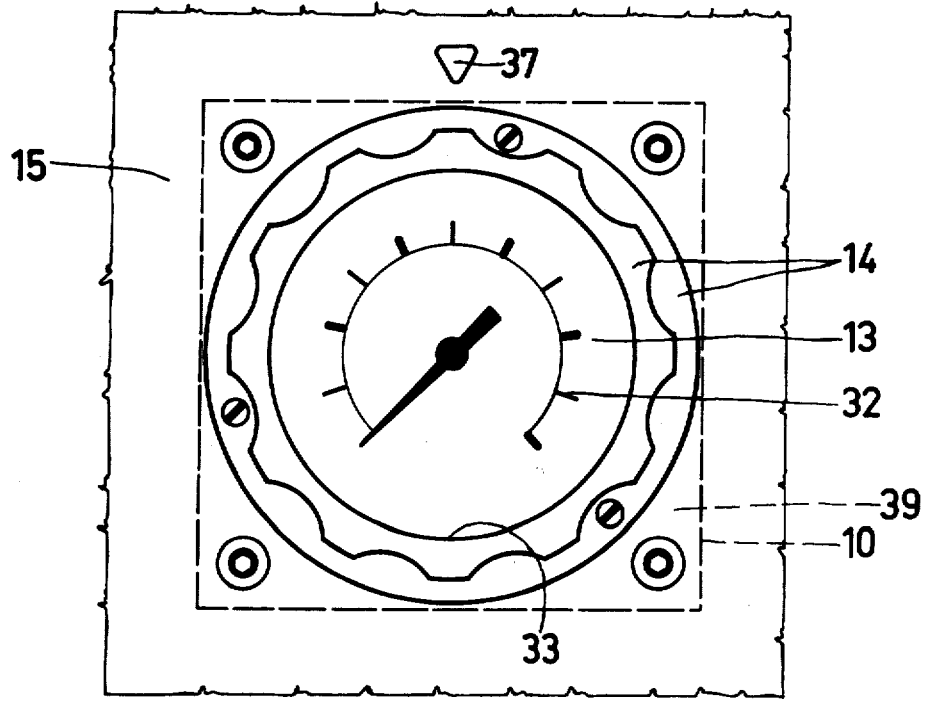
FIG. 2 shows the selector valve of FIG. 1, as seen from the front.

A preferred embodiment of a selector valve, as suggested by the present invention, is shown in FIGS. 1 through 4a. This valve device is particularly adapted for use in connection with the hydraulic control system of a production machine, such as an injection molding machine, for example. Its purpose is to permit a quick and accurate verification of various hydraulic pressures by means of a common, centrally located pressure gauge.

The particular unit which is shown in the drawings is designed for connection to six separate pressure lines. Obviously, the unit could also be adapted for a larger or smaller number of pressure lines. As shall be explained in detail further below, the proposed selector valve provides for the selective connection of any one of the six pressure lines to a central pressure gauge, while depressurizing the latter, whenever the selecting mechanism of the valve is positioned between two pressure lines. This is done by connecting the pressure gauge to a relief channel which leads to the hydraulic tank.

Figure 3:
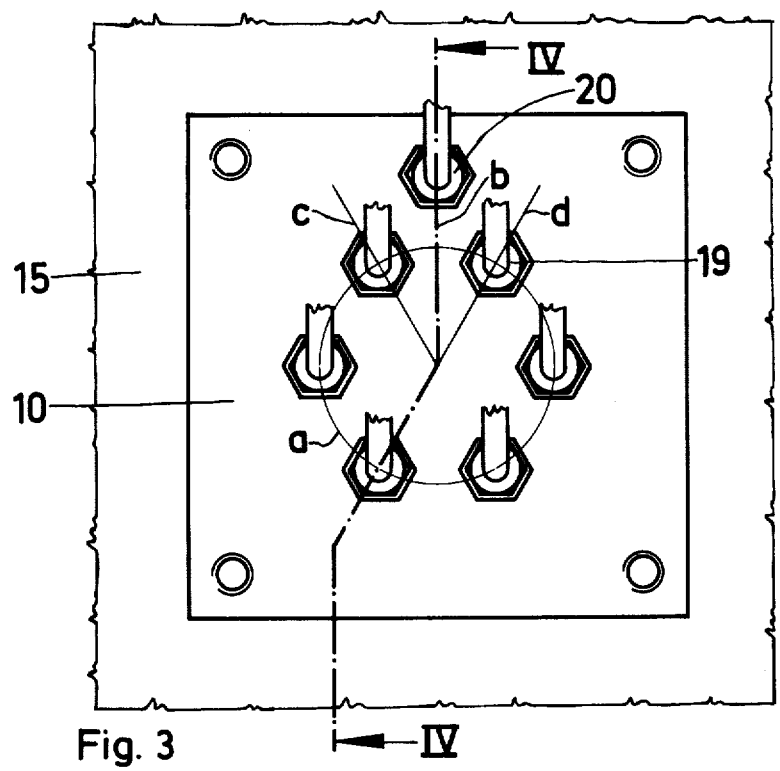
FIG. 3 shows the selector valve of FIG. 1, as seen from the rear.
Figure 4:
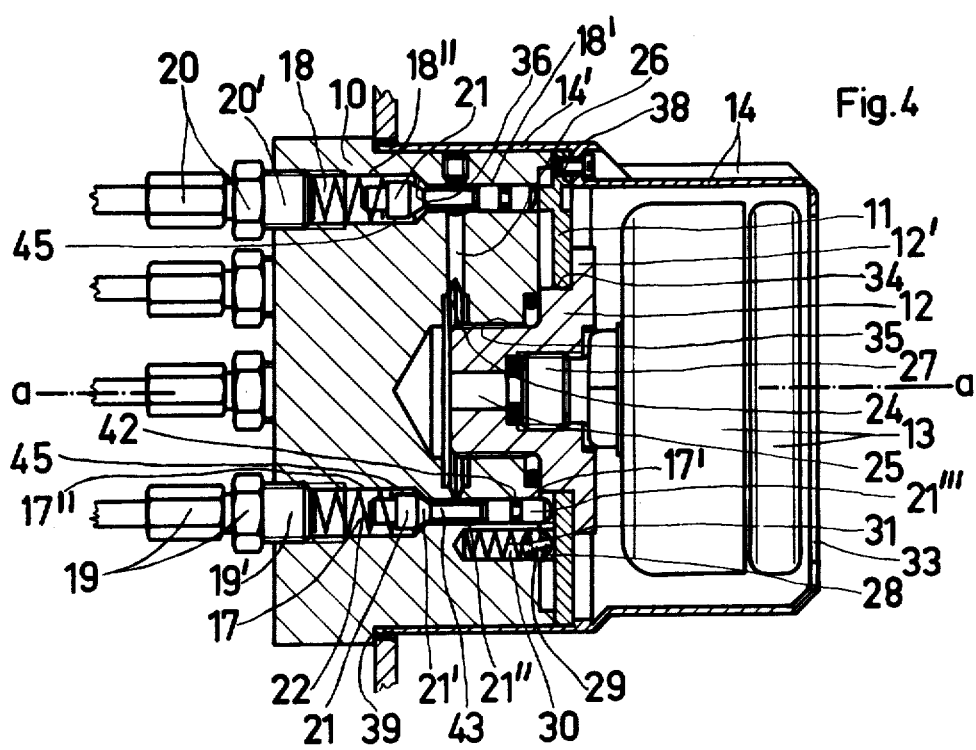
FIG. 4 is a vertical longitudinal cross section through the selector valve of FIGS. 1-3, taken along line IV—IV of FIG. 3, the selector valve being shown in a depressurized position.

Referring to FIGS. 3 and 4 of the drawing, it can be seen that the selector valve consists essentially of a valve base 10 in the form of a short cylindrical block, having on its rear side an enlarged square flange portion, for the attachment of the unit to the vertical wall 15 of a machine base, or some other supporting structure, by means of suitable threaded fasteners which clamp the mounting face 39 of the valve base against the side of the wall 15. The latter has a large aperture through which the cylindrical portion of the valve assembly can be inserted from the rear.

Inside the valve base 10 are arranged six parallel, axially oriented pressure line bores 17, the centers of which are spaced at regular angular intervals around a circle a (FIG. 3). The six pressure line bores 17 extend all the way through the valve base 10, having smooth valve bore portions 17' in the forward portion of the valve base and enlarged connecting bore portions 17" extending to its rear side. At the transitions between these two bore portions are formed valve seats 36 in the form of a tapered shoulder. The rear extremities of the enlarged connecting bore portions 17" are threaded to receive the threaded extensions 19' of suitable pressure line connectors 19.

The arrangement of all the pressure lines in a parallel, axial direction greatly simplifies the installation and connection of the device, especially in a situation where there would otherwise be little room for access with assembly tools, due to the presence of other instruments and control components, for example. The proposed arrangement makes it possible to permanently connect all the pressure lines to the selector valve assembly, while the latter is still removed from its intended place in the machine wall 15, resting temporarily on a flat support, for instance. The assembled and connected device can then be simply inserted from behind through its mounting aperture, whereupon its attachment screws are tightened. In the mounted position, the major portion of the selector valve assembly protrudes from the front side of the machine wall 15, being conveniently accessible for operation of the pressure line selecting mechanism and for reading of the pressure gauge.

Figure 4A:
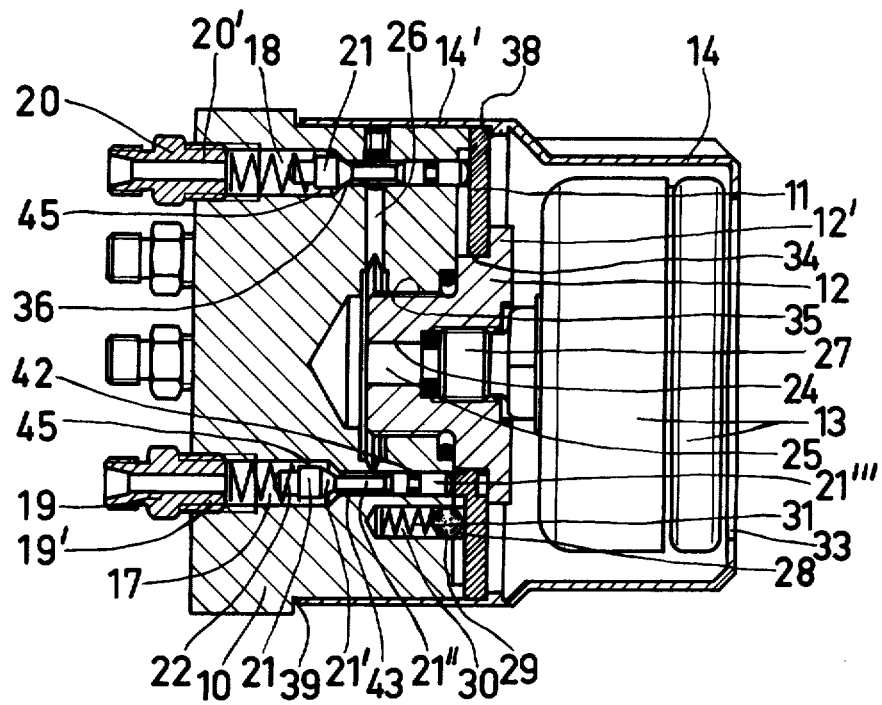
FIG. 4a is similar to FIG. 4, showing the selector valve in a position in which a pressure line is connected.
Figure 7:
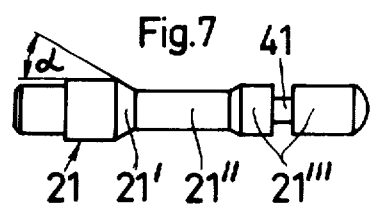
FIG. 7 shows a typical line valve plunger, at an enlarged scale.

As can be seen in FIGS. 4 and 4a, each pressure line bore 17 has arranged in its valve bore portion 17' a matching valve plunger 21 (see also FIG. 7) and a valve spring 22 which bears against the rear side of the valve plunger 21 and against the forward extremity of the pressure line connector 19. The valve plunger 21 has an enlarged rear portion with a centering shoulder for the valve spring 22 and a smaller-diameter forwardly extending valve stem 21". A tapered shoulder 21' between these two plunger portions forms the valve element which cooperates with the valve seat 36 of the valve bore portion 17', opening and closing an annular passage, as the valve plunger 21 is moved in the axial direction, in opposition to the valve spring 22.

The valve stem 21, in its midportion, has a diameter which is smaller than that of the valve bore portion 17', thereby defining an annular flow channel 43. A plunger head 21"' on the forward end portion of the valve stem 21 fits the diameter of the valve bore portion 17'. An O-ring 42, seated in an annular groove 41 in the plunger head 21"' serves to seal off the pressure line bore in the forward direction in all positions of the valve plunger 21. The valve plungers 21 are so designed that their plunger heads 21"' protrude forwardly from the pressure line bores, for engagement by a valve opening mechanism which will be described further below.

In the center of the valve base 10 is arranged a large connecting cavity 24 (see also FIG. 11) with a groove-like annular enlargement of a diameter which intersects the valve bore portions 17' of the pressure line bores 17 in the area of the annular flow channel 43. At the points of intersection, however, the annular enlargement of the central connecting cavity 24 is tapered so as to form axially narrow, slot-shaped passages 23 into the annular flow channels 43. The result of this configuration is that the passages 23 have a considerably smaller flow cross section than the annular flow channels 43, thereby providing a certain throttling effect on the flow of hydraulic fluid through these passages. An additional advantage of this particular shape of the connecting passages 23 resides in the fact that they simplify the insertion of the valve plungers 21 into the valve bore portions 17', by preventing damage to the O-rings which have to slide past the connecting passages 23.

The forward portion of the central connecting cavity 24 is formed by a large threaded bore 35 into which is screwed a threaded socket 12 (FIGS. 8 and 9). The socket 12 is hollow, having a central bore 25 with an enlarged threaded bore for the connecting stud 27 of a conventional pressure gauge 13. On its forward side, the socket 12 has a shoulder formation consisting of a short cylindrical journal support 34 and an enlarged flange portion 12' of hexagonal contour, for engagement by a suitable wrench (FIG. 8).

Figure 5:
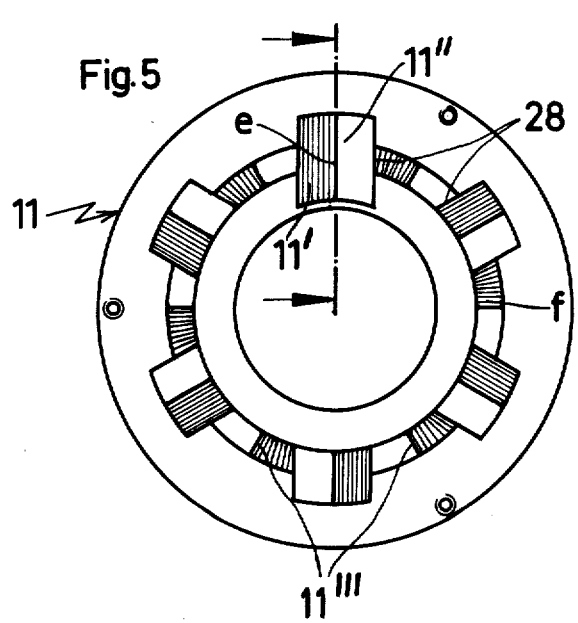
FIG. 5 shows the selector disc of the selector valve of FIGS. 1-4.
Figure 6:
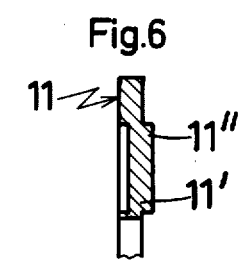
FIG. 6 is a partial transverse cross section through the selector disc of FIG. 5.

On the journal support 34 of the threaded socket 12 is supported a selector disc 11 of an outer diameter which is approximately the same as that of the cylindrical portion of the valve base 10. A peripheral axial shoulder of the valve base 10 and the flange portion 12' of the threaded socket 12 determine the position of the selector disc 11 in the axial sense. On the rear side of the selector disc 11 is arranged a selector cam 11' (FIG. 6), at a distance from the valve axis a—a which is equal to the radius of the circle a on which are located the pressure line bores 17. By rotating the selector disc 11, its selector cam 11' can be brought into alignment with any one of the six pressure line bores 17, so that the valve plunger 21 of the selected pressure line is pushed rearwardly, against the preload of its valve spring 22, thereby opening the pressure line into the central connecting cavity 24. The pressure gauge 13 now indicates the hydraulic pressure which exists inside the selected pressure line. FIGS. 5 and 6 show that the selector disc 11 carries a number of additional cam formations; these will be described further below, in connection with additional operational features of the invention.

A selector sleeve 14 serves to rotate the selector disc 11, while giving a visual indication of its position. It surrounds the pressure gauge 13 and the forward portion of the valve base 10 and is removably clamped to the selector disc 11. For this purpose, the selector sleeve 14 has a rearwardly facing annular shoulder 38 which accommodates screws for a clamping engagement between that shoulder and the selector disc 11. The larger rear portion of sleeve 14 forms a dial 14' which carries identifying information for the various pressure lines (see FIG. 1). The dial 14' is so arranged that the particular pressure line information which corresponds to the selected pressure line is positioned on the top tangent x—x of the unit, just underneath a stationary reference mark 37 on the machine wall 15. The smaller forward portion of the selector sleeve 14, while providing a protective enclosure for the pressure gauge 13, offers a convenient grip surface for manual rotation of the selector mechanism. The front side of sleeve 14 is open, forming a window 33 through which the pressure gauge 13 can be read. This arrangement gives a maximum of operating convenience for the manual setting of the selector valve and for the visual verification of the valve settings and pressure readings. The selector sleeve 14 is preferably a single, injection-molded part.

The valve base 10, in addition to having six pressure line bores 17 on circle a, has extending through it a seventh bore which serves as a tank line bore, or pressure relief bore 18. In diameter and outline, the pressure relief bore 18 is identical with the six pressure line bores 17, but its radial location is outside the circle a, as can be seen in FIG. 3 and FIG. 10. In the angular sense, the pressure relief bore 18 lies on a vector b, at mid-distance between the vectors c and d of two nearest pressure line bores 17. Like the pressure line bores 17, the pressure relief bore 18 has a connecting bore portion 18'' and a valve bore portion 18', with a valve plunger 21 movably arranged inside the latter. Similarly, the tank line connector 20 and its threaded extension 20' are identical with the pressure line connector 19 and its threaded extension 19'. A radial channel 26 connects the annular flow channel of the pressure relief valve to the central connecting cavity 24. The annular flow channels 43 of all valves are thus always connected with each other and with the pressure gauge 13, via the central connecting cavity 24.

The invention provides for the pressure relief valve to be opened, for a depressurization of the pressure gauge 13, whenever the selector valve is reset from one pressure line connecting position to another, or whenever it is left in an intermediate setting, which represents a rest position of the device in which it is preferably left when not in use. The opening movement of the pressure relief valve plunger 21 is likewise controlled by the selector disc 11 which, for this purpose, has arranged on its forward side six pressure relief cams 11''. These cams are angularly regularly spaced and arranged on the same radius as the pressure relief bore 18. Because the pressure relief bore 18 is arranged midway between two pressure line bores, one of the relief cams 11'' coincides angularly with the selector cam 11'.

The adjustment of the six pressure line connection settings and of the six intermediate pressure relief settings of the selector valve is facilitated by means of a detent mechanism which is shown in FIGS. 4 and 4a. This detent mechanism consists of a detent member 29 in the form of a steel ball which is guided inside a detent lodgement 30 in the form of a blind bore. Inside the latter is also received a detent spring 31. The distance of the detent lodgement 30 from the valve axis a—a is such that it falls between the radius of the pressure line circle a and the radius of the pressure relief bore 18. At this same distance, the selector disc 11 carries twelve detent cams 11''', for the establishment of the twelve detent positions representing, alternatingly, a line connecting position and a pressure relief position.

The twelve detent cams 11''' are shown in FIG. 5, where it can also be seen that every second detent cam 11''' is angularly aligned with a relief cam 11''. And, as the drawing indicates, the aligned cams are identical in shape, so that they become radially continuous cam formations. For this to be possible, all three types of cams have the same oppositely inclined cam surfaces f. It will be noted, however, that, while the selector cam 11' and the six relief cams 11'' are in an operative position, when one of the cam crests is in alignment with a pressure line bore 17, or with the pressure relief bore 18, respectively, the proposed detent action for that operative position requires that the detent member 29 be aligned with one of the twelve detent depressions 28 which are formed between the detent cams 11'''. Accordingly, the angular location of the detent lodgement 30 must be offset from the vector of one of the seven valve bores in the valve base 10 by an angle equal to one-half of the angular spacing between two adjacent detent cams 11'''. This means that the detent lodgement 30 must be located between two pressure line bores 17, but closer to one of the two bores, so that the respective distances are one-quarter and three-quarters of the angular spacing between the two bores 17 (see FIG. 10).

The proposed novel structure of a selector valve is such that it offers several important manufacturing advantages: The arrangement of the six pressure line bores 17 and of the pressure relief bore 18 in parallel axial alignment and with identical dimensions greatly simplifies the machining operations on the valve base 10. Similarly, the arrangement of the various cams on the selector disc in angular alignment and in radially continuous formation makes it possible to produce this part as a simple sheet metal stamping, whereby the cam protrusions on the rear side of the disc are obtained through the formation of matching depressions on the front side of the disc. The selector sleeve 14, as previously mentioned, is preferably injection-molded of plastic material, and the pressure line information on the dial 14' may be molded right into the part, or it may be applied to its outer surface by way of a decal or an adhesive-backed label.

When not in use, the selector device of the invention is preferably left in a pressure relief position, i.e. in a position in which the selector cam 11' is located between two pressure line bores 17 and one of the six relief cams 11'' maintains the pressure relief valve in the open position, thereby depressurizing the pressure gauge 13. The same depressurization also occurs each time when the selector device is switched from one pressure line connecting position to another.

When the selector valve is in one of its six pressure line connecting positions, its central connecting cavity 24 and its pressure gauge 13 are subjected to the hydraulic pressure of the connected pressure line. The same pressure is then also present in all the annular flow channels 43 of the pressure line bores 17 and of the pressure relief bore 18. It is important that, especially in the case of the pressure relief bore 18, this pressure will not, under any circumstances, open the pressure relief valve, so as to discharge hydraulic fluid into the tank line. While it is, of course, possible to use for this valve a highly preloaded valve spring, this is not desirable. The present invention, therefore, proposes to axially compensate the hydraulic pressure inside the annular flow channels 43, so as to exert no axial force on the valve plunger 21. This is accomplished by arranging for the valve seat 36 to be arranged at the very edge of the valve bore portion 18' (or 17', in the case of the pressure line bores 17), so that substantially identical areas of the valve plunger 21 are exposed to the hydraulic pressure in both axial directions. In order for the valve seat 36 to be thus confined to the edge of the valve bore portion, the taper angle α of the shoulder 21' of the valve plunger 21 is smaller than the corresponding taper angle of the valve seat 36.

By way of a modification of the proposed embodiment of the invention, it is also possible to arrange the pressure line bores on only one-half of the circumference of a circle, especially when few pressure lines are involved. In this case, the selector disc carries its control cams likewise on only one-half of its circumference. In this case, it may be advantageous to arrange an exact duplicate of all the control cams on the other half of the selector disc.

It should be understood, of course, that the foregoing disclosure describes only a preferred embodiment of the invention and that it is intended to cover all changes and modifications of this example of the invention which fall within the scope of the appended claims.

I claim the following:

1. A rotary selector valve device for the selective connection of a pressure responsive device, such as a pressure gauge or other pressure sensing device, to any one of a number of separate pressure lines of a fluid pressure operated system, the selector valve comprising in combination:
   a valve base adapted to be mounted on a stationary support, the valve base defining a longitudinal valve axis and axially opposite front and rear sides;
   a plurality of pressure line bores extending axially through the valve base, with their centers located on a circle around the valve axis, each pressure line bore having a rearwardly extending connecting bore portion and a forwardly adjoining valve bore portion with a rearwardly facing valve seat therebetween;
   a valve plunger movably arranged in each pressure line bore, as part of a pressure line valve, each valve plunger including a forwardly facing shoulder cooperating with the associated valve seat, in a valve opening and closing action, in addition to a valve stem which protrudes from the forward end of the pressure line bore, while sealingly closing off the latter in all valve plunger positions;
   a valve spring engaging the valve plunger from the rear, so as to exert a valve closing bias thereagainst;
   a central connecting cavity in the valve base communicating with each pressure line valve bore portion, at a point located axially forwardly of its valve seat;
   a selector disc supported on the front side of the valve base so as to be manually rotatable about the valve axis, the selector disc including, on its rear side, a selector cam arranged on the same circle as the pressure line bores, so as to cooperate with the protruding valve stem of a selected pressure line bore, when the selector cam is rotated into alignment therewith, thereby pushing its valve plunger into an open position and connecting that pressure line to the central connecting cavity;
   detent means associated with the selector disc and operable to resiliently retain the selector disc in each position in which its selector cam is angularly aligned with a pressure line bore; and
   means for sealingly connecting said pressure responsive device to the central connecting cavity.

2. A rotary selector valve as defined in claim 1, further comprising
   a pressure relief bore in the valve base, said bore having a connecting bore portion leading to the outside of the valve base and an adjoining valve bore portion with an intermediate valve seat facing toward the connecting bore portion, the valve bore portion opening towards the selector disc on the front side of the valve base;
   a relief valve plunger movably arranged in the pressure relief bore, as part of a pressure relief valve, the relief valve plunger including a shoulder cooperating with said valve seat, in a relief valve opening and closing action, in addition to a valve stem which protrudes from the valve bore portion, while sealingly closing off the latter in all relief valve plunger positions; and
   a relief valve spring engaging the valve plunger so as to exert a valve closing bias thereagainst; and wherein
   said central connecting cavity also communicates with the valve bore portion of the pressure relief bore, at a point located between its valve seat and the sealed-off valve bore portion; and
   the selector disc further includes a plurality of relief cams arranged on a circle which is different from the circle of the selector cam and pressure lines, thereby cooperating with the valve stem of the relief valve plunger in such a way that the pressure relief valve is opened in angular positions of the selector disc which lie between the positions in which a pressure line valve is opened.

3. A rotary selector valve as defined in claim 2, wherein
   the pressure relief bore extends likewise axially through the valve base, at a distance from the valve axis which corresponds to the radius of the circle defined by the relief cams on the selector disc; and
   the pressure relief bore and its pressure relief valve have substantially the same dimensions as the pressure line bores and their pressure line valves.

4. A rotary selector valve as defined in claim 2, wherein
   the pressure relief bore extends likewise axially through the valve base, at a distance from the valve axis which corresponds to the radius of the circle defined by the relief cams on the selector disc;
   the relief cams are arranged on the rear side of the selector disc and the diameter of the relief cam circle is larger than the diameter of the pressure line circle;

the relief cams on the selector disc and the pressure line bores in the valve base have the same angular spacing on their respective circles; and the pressure relief bore and its relief cams are angularly so arranged relative to the pressure line bores and their selector cam that the pressure relief valve is opened, whenever the selector cam is positioned half-way between two adjacent pressure line bores.

5. A rotary selector valve as defined in claim 4, wherein the pressure relief bore in the valve base is located angularly at mid-distance between the vectors of two adjacent pressure line bores; and the selector cam on the selector disc is angularly aligned with one of the relief cams.

6. A rotary selector valve as defined in claim 4 or claim 5, wherein the detent means is also operable to resiliently retain the selector disc in each position in which one of its relief cams is angularly aligned with the pressure relief bore.

7. A rotary selector valve as defined in claim 4, wherein the detent means includes an axially extending detent lodgement in the valve base which is open towards the front of the valve and has arranged in it a detent member and a detent spring biasing said member forwardly, against the selector disc;

the selector disc further includes, on its rear side, as part of said detent means, a plurality of detent depressions, arranged on a detent circle whose radius corresponds to the distance of the detent lodgement from the valve axis; and said detent circle has a different diameter than both the relief cam circle and the pressure line circle.

8. A rotary selector valve as defined in claim 7, wherein the detent depressions are in the form of valleys, defined between pairs of adjacent detent cams on the rear side of the selector disc;

every second detent cam is angularly aligned with a relief cam; and the aligned pairs of detent cams and relief cams have matching shapes, being defined by radially continuous cam formations.

9. A rotary selector valve as defined in claim 8, wherein the pressure relief bore in the valve base is located angularly at mid-distance between the vectors of two adjacent pressure line bores;

the selector cam on the selector disc is angularly aligned with one of the aligned pairs of detent cams and relief cams; and the three aligned cams have matching shapes, being defined by a radially continuous cam formation.

10. A rotary selector valve as defined in claim 8, wherein the selector disc is a shaped sheet metal stamping; and the selector cam, relief cams, and detent cams on the rear side of the selector disc are protrusions which are the result of the shaping of corresponding depressions on the front side of the selector disc.

11. A rotary selector valve as defined in claim 1 or claim 2, wherein the valve bore portions are continuous, smooth bores which are smaller in diameter than the connecting bore portions;

the valve seats are tapered transitions between said valve bore portions and connecting bore portions, and the cooperating shoulders of the valve plungers are likewise tapered;

the stems of the valve plungers include stem portions of a diameter which is smaller than the diameter of the valve bore portions, thereby defining annular flow channels with the latter, and they further include forwardly adjoining larger plunger heads forming moving seals with the valve bore portions; and each of said annular flow channels communicates with the central connecting cavity.

12. A rotary selector valve as defined in claim 11, wherein the taper angle of the valve seats is larger than the taper angle of the valve plunger shoulders, so as to restrict the area of actual seating contact to a narrow annular corner area of a diameter which is substantially identical with the diameter of the valve bore portion, thereby equalizing the axially oppositely pressure-exposed areas of the valve plunger stems at the plunger shoulders and plunger heads, when the valves are in their closed condition.

13. A rotary selector valve as defined in claim 11, wherein the central connecting cavity communicates with the annular flow channels of the valve bore portions through an annular groove surrounding the connecting cavity, said groove having an outer diameter which intersects the valve bore portions in the area of said annular flow channels; and the annular groove is tapered, having flanks which converge in the axial sense, so as to form axially narrow flow passage which lead into the annular flow channels, while providing a flow throttling action.

14. A rotary selector valve as defined in claim 1 or claim 2, wherein the pressure responsive device is a pressure gauge;

the means for connecting said device to the central connecting cavity includes a threaded socket engaged in a matching threaded bore of the valve base, and the threaded socket, in turn, is engaged by a threaded extension of the pressure gauge; and the threaded socket includes a journal support for the selector disc and a larger rearwardly facing flange portion which forwardly adjoins the journal support, thereby positioning the selector disc in the axial sense, in cooperation with a forwardly facing guide surface of the valve base.

15. A rotary selector valve as defined in claim 1 or claim 2, wherein the pressure responsive device is a pressure gauge of generally cylindrical outline;

the selector disc carries a manually grippable selector sleeve which surrounds, and at least partially encloses, the pressure gauge; and the selector sleeve carries pressure line information which is readable against a stationary reference, thereby indicating the setting of the selector valve.

16. A rotary selector valve as defined in claim 15, wherein the valve base has an outwardly cylindrical forward portion;

the selector sleeve includes a tubular dial portion which carries the pressure line information and extends rearwardly from the selector disc, so as to surround the cylindrical valve base portion; and the portion of the selector sleeve which surrounds the pressure gauge extends forwardly from the selector disc.

* * * * *